(12) United States Patent
Dong et al.

(10) Patent No.: US 11,622,506 B2
(45) Date of Patent: Apr. 11, 2023

(54) LAWN MOWER HAVING IMPACT PROTECTION ASSEMBLY

(71) Applicant: Globe (Jiangsu) Co., Ltd, Jiangsu (CN)

(72) Inventors: Jianhua Dong, Jiangsu (CN); Wanchun Jiao, Jiangsu (CN)

(73) Assignee: Globe (Jiangsu) Co., Ltd, Changzhou (CN)

( * ) Notice: Subject to any disclaimer, the term of this patent is extended or adjusted under 35 U.S.C. 154(b) by 239 days.

(21) Appl. No.: 17/087,602

(22) Filed: Nov. 2, 2020

(65) Prior Publication Data
US 2021/0137011 A1   May 13, 2021

(30) Foreign Application Priority Data
Nov. 7, 2019   (CN) .......................... 201911080096.6

(51) Int. Cl.
*A01D 69/06*   (2006.01)
*A01D 34/685*   (2006.01)
*A01D 34/76*   (2006.01)

(52) U.S. Cl.
CPC ........... *A01D 69/06* (2013.01); *A01D 34/685* (2013.01); *A01D 34/76* (2013.01)

(58) Field of Classification Search
CPC ....... A01D 69/06; A01D 34/685; A01D 34/76
See application file for complete search history.

(56) References Cited

U.S. PATENT DOCUMENTS 3,788,050 A   1/1974   Houst et al.
4,090,346 A * 5/1978   Doi ........................ A01D 34/47
                                                              56/13.6

(Continued)

FOREIGN PATENT DOCUMENTS

| EP | 2923552 A1 | 9/2015 |
| EP | 2923551 B1 | 12/2016 |
| KR | 101801372 B1 | 11/2017 |

OTHER PUBLICATIONS

Extended Search Report of Counterpart European Patent Application No. 20206123.0 dated Mar. 24, 2021.

*Primary Examiner* — Thomas B Will
*Assistant Examiner* — Julia C Tran

(57) ABSTRACT

The invention provides a lawn mower, which comprises a driving assembly, an impact protection assembly, a transmission assembly and a cutting assembly. The driving assembly comprises a motor. The impact protection assembly comprises a pressing member and an elastic piece. The pressing member presses the elastic piece towards the transmission assembly to drive the transmission assembly and the cutting assembly to synchronously rotate with the motor shaft. When the resistance of the cutting assembly is greater than a predetermined value, A relative rotation is generated between the transmission assembly and the motor shaft. According to the lawn mower, the impact protection assembly is arranged between the driving assembly and the transmission assembly, when the reaction force upon the cutting assembly from external obstacles is greater than the friction force of the impact protection assembly, the transmission assembly and the motor shaft rotate relatively, and the transmission assembly is protected.

6 Claims, 6 Drawing Sheets

(56) References Cited

U.S. PATENT DOCUMENTS

| | | | |
|---|---|---|---|
| 2002/0027054 A1* | 3/2002 | Osborne | F16D 67/02 |
| | | | 192/93 A |
| 2006/0010847 A1* | 1/2006 | Vandyke | A01D 34/733 |
| | | | 56/255 |
| 2009/0088260 A1* | 4/2009 | Harkcom | A01D 75/182 |
| | | | 29/445 |
| 2012/0186930 A1 | 7/2012 | Salvia et al. | |
| 2015/0080135 A1* | 3/2015 | Torno | A01D 34/62 |
| | | | 464/62.1 |
| 2018/0160622 A1* | 6/2018 | Pellenc | A01D 43/063 |
| 2018/0271012 A1* | 9/2018 | Guo | A01D 34/4166 |

* cited by examiner

LAWN MOWER HAVING IMPACT PROTECTION ASSEMBLY

CROSS-REFERENCE TO RELATED INVENTIONS

This invention is a US invention which claims the priority of CN application Serial No. 201911080096.6, filed on Nov. 7, 2019, the disclosures of which are hereby incorporated by reference in their entirety.

TECHNICAL FIELD

The invention relates to a garden tools, in particular to a lawn mower.

BACKGROUND ART

The lawn mower is a common garden tool. When the working area is large, lawn mower with a single and small-size blade will spend lots of time to work. However, if a large-sized lawn mower is used, there will be two problems. First, as the blade is heavy, the current is high, energy consumption is rapid, and the working time is reduced. second, when the blade is rotated, the mower vibrates easily, which affects the life of the machine.

In the prior art, in order to solve the above-mentioned problems, two small size blades are provided on the lawn mower, and the two blades can be rotated simultaneously by a gear box or belt. In addition, in order to cut the grass between the two blades, during the mower working, the cutting range of the two blades is configured to partially overlap. The two blades must be kept at a certain angle during working.

In addition, in order to reduce noise, plastic gears are used. However, there may be obstacles like stone on the lawn, When the cutting blade rotates at high speed and hits a hard obstacle, the reaction force of the obstacle will cause the blade to stop rapidly, the blade, the gear box or the motor will be damaged.

Therefore, it is necessary to provide a lawn mower to solve the problems mentioned.

SUMMARY OF INVENTION

An object of the present invention is to provide a lawn mower with an impact protection function.

In order to achieve the above object, the present invention adopts the following technical solution: A lawn mower, which includes a driving assembly, an impact protection assembly, a transmission assembly and a cutting assembly. The driving assembly includes a motor. The impact protection assembly includes a pressing member and an elastic piece, the elastic piece being pressed against the transmission assembly and driving the transmission assembly and the cutting assembly to rotate synchronously with the motor shaft. When the resistance received by the cutting assembly is greater than a predetermined value, a relative rotation occurs between the transmission assembly and the motor shaft.

As a further improved technical solution of the present invention, the transmission assembly includes a first gear connected to the motor shaft and a second gear meshed with the first gear, and the cutting assembly includes a first blade connected to the second gear.

As a further improved technical solution of the present invention, the transmission assembly further comprises a third gear and a fourth gear, and the third gear meshes with the first gear and the fourth gear respectively, the cutting assembly further including a second blade connected to the fourth gear.

As a further improved technical solution of the present invention, the second gear and the third gear are located on opposite sides of the first gear respectively, and the fourth gear is disposed away from the first gear.

As a further improved technical solution of the present invention, four gears rotate in the same plane, and the first blade and the second blade rotate perpendicular to each other and rotate in the same plane.

As a further improved technical solution of the present invention, the impact protection assembly further comprises a pressing block and a friction plate, and the elastic piece, the pressing block and the friction plate are sequentially disposed between the pressing member and the first gear, the friction plate being a copper plate.

As a further improved technical solution of the present invention, the first gear comprises a gear connection member and a gear ring fixed on the gear connection member, and the friction plate is in contact with the gear connection member.

As a further improved technical solution of the present invention, the motor further comprises a shaft sleeve fixed on the motor shaft, one end of the shaft sleeve is provided with a groove for mounting the pressing member, and the other end is provided a protrusion in the radial direction, the elastic piece, the pressing block, the friction plate and the gear connection member being sequentially sleeved on the shaft sleeve and pressed between the pressing member and the protrusion, the pressing member is an opening retaining ring.

As a further improved technical solution of the present invention, the transmission assembly further comprises a gear box for receiving the four gears, and the gear box is provided with an opening for installing the driving assembly, and the driving assembly included a bracket that mates with the opening to mount the driving assembly on the gear box.

As a further improved technical solution of the present invention, the lawn mower further comprises a control unit, and when a relative rotation occurs between the transmission assembly and the motor shaft, an instantaneous current increases, so the control unit controls the driving assembly to stop.

It can be known from the above technical solutions that the lawn mower of the present invention provides an impact protection assembly between the driving assembly and the transmission assembly, so that when the reaction force of the cutting assembly by an external obstacle is greater than the frictional force of the impact protection assembly, the relative rotation between the transmission assembly and the motor shaft is generated, thereby achieving the purpose of protecting the transmission assembly.

DESCRIPTION OF EMBODIMENT

In order to make the objectives, technical solutions, and advantages of the present invention clearer, the following describes the present invention in detail with reference to the accompanying drawings and specific embodiment.

Figure 1:
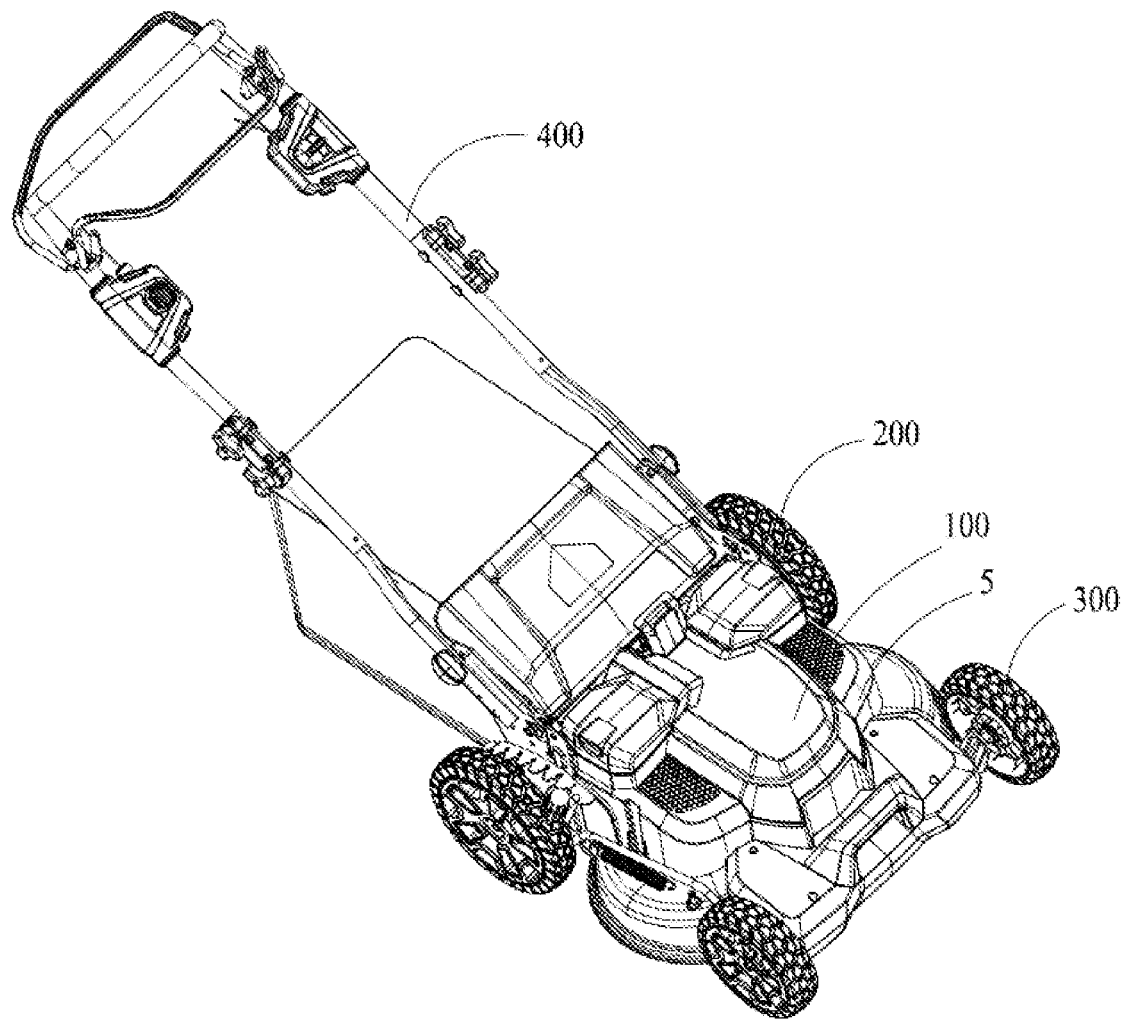
FIG. 1 is a perspective view of a lawn mower according to the present invention.
Figure 2:
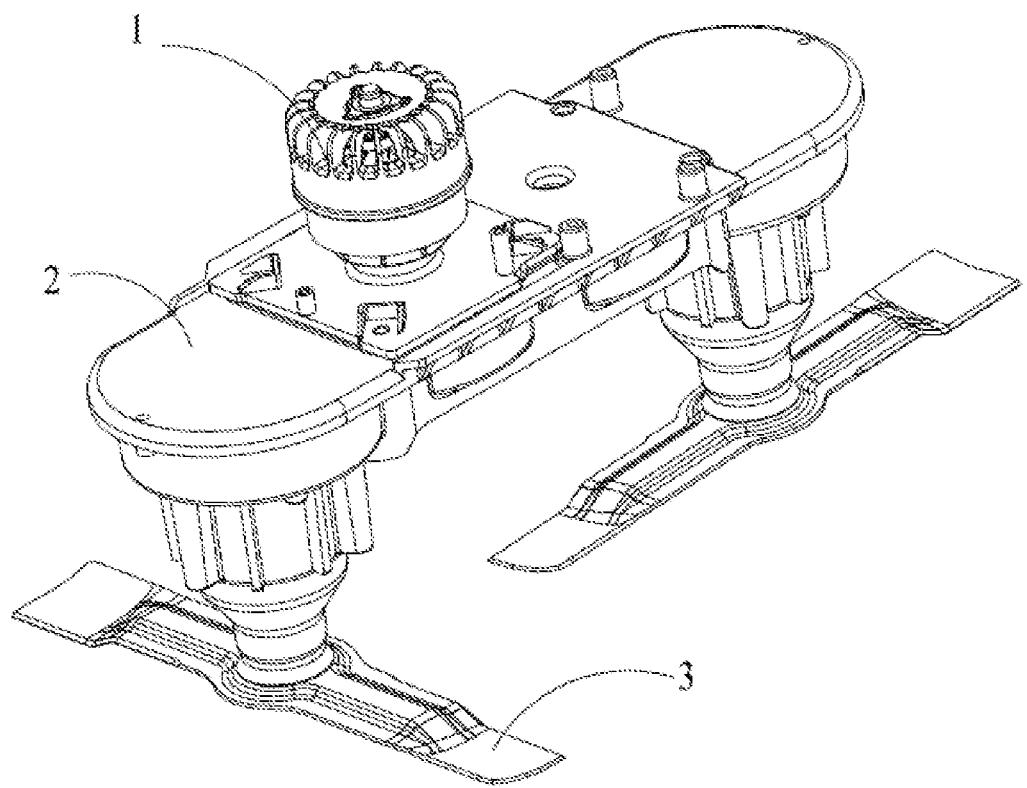
FIG. 2 is a perspective view of some assemblies of the lawn mower of the present invention.

Please refer to FIG. 1 and FIG. 2, the invention provides a lawn mower, which includes a main body 100, a rear walking wheel 200, a front walking wheel 300, and a push rod 400.

Figure 4:
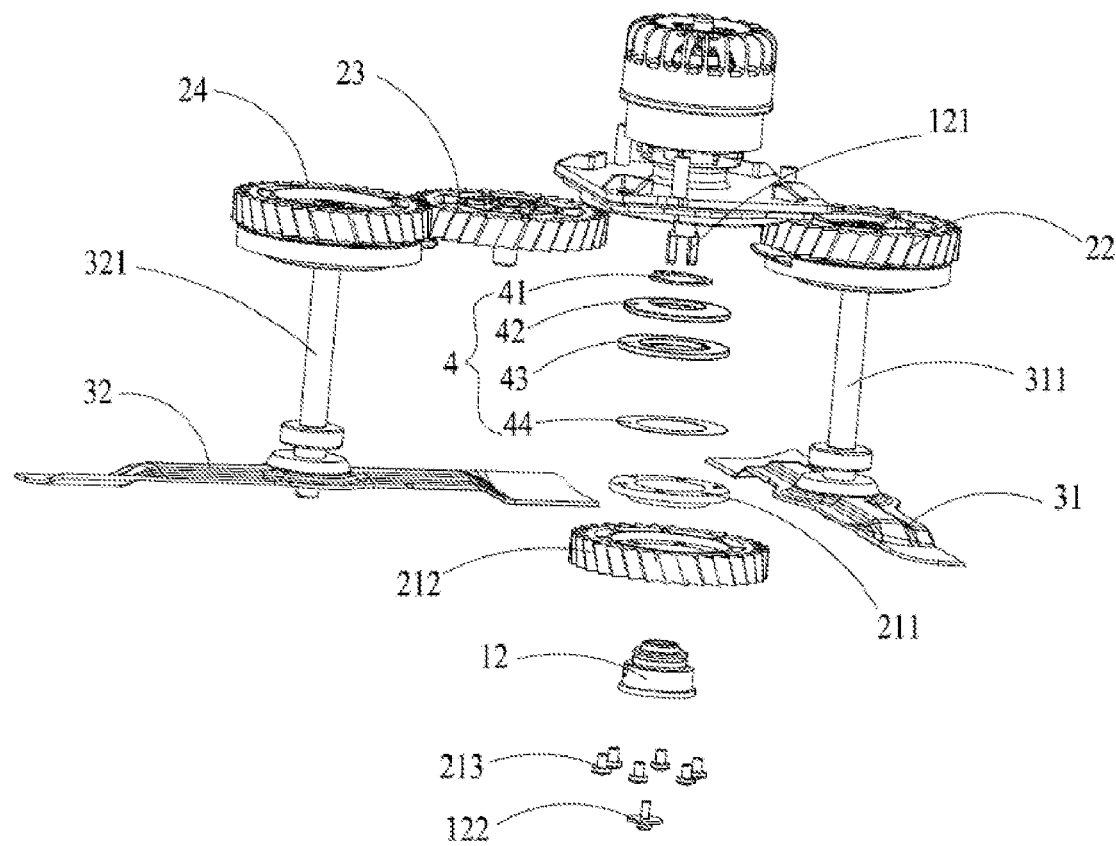
FIG. 4 is another exploded view of some assemblies in FIG. 2.

Please further refer to FIG. 4, the main body 100 includes a housing 5, a driving assembly 1 disposed in the housing 5, a transmission assembly 2, an impact protection assembly 4 which is located between the driving assembly 1 and the transmission assembly 2, a cutting assembly 3 which is located under the housing 5 and is connected to the transmission assembly 2, and control unit (not shown). The rear walking wheel 200 and the two front walking wheels 300 are disposed below the housing 5. The push rod 400 is provided at the rear of the housing 5. The push rod 400 is preferably a U-shaped structure, which includes a left handle and a right handle extending rearward and upward along the rear portion of the housing 5. The left and right handles are connected by a cross bar. The handles and the cross bar may be integrally formed or assembled together. A driving switch and a self-propelled switch are fixed on the push rod 400. The driving switch is used to control the driving assembly 1. The self-propelled switch is used to control the movement of the lawn mower.

Figure 6:
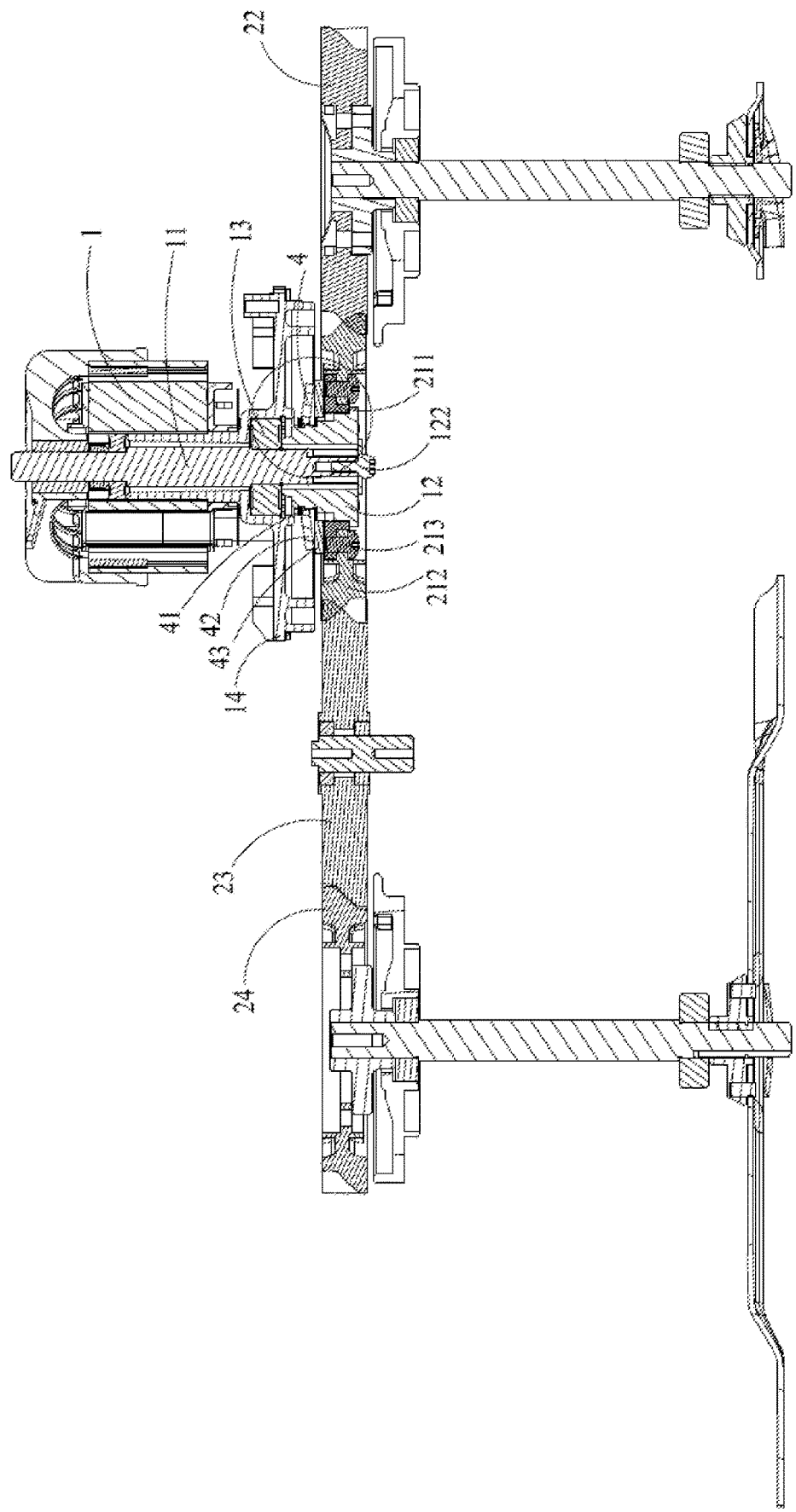
FIG. 6 is a cross-sectional view of some assemblies in FIG. 2.

Please refer to FIG. 4 and FIG. 6, the driving assembly 1 is a motor, the motor includes a motor shaft 11, a shaft sleeve 12 fixed to the motor shaft 11 and a bracket 14. The bracket 14 is mounted on the motor shaft 11 through a bearing 13. The shaft sleeve 12 is specifically fixed at the lower end of the motor shaft 11 by screws 122. In the radial direction, the motor shaft 11 and the shaft sleeve 12 are fixed together by a flat key 121.

The transmission assembly 2 is used to transmit the power of the motor to the cutting assembly 3. Please refer to FIGS. 3 and 4. Specifically, the transmission assembly 2 includes a first gear 21 connected to the motor shaft 11 and a second gear 22 meshed with the first gear 21. Preferably, the transmission assembly 2 further includes a third gear 23 and a fourth gear 24. The third gear 23 meshes with the first gear 21 and the fourth gear 24, and the second gear 22 and the third gear 23 are respectively located on the opposite sides of the first gear 21. The fourth gear 24 is disposed away from the first gear 21, and the four gears rotate in the same plane.

The cutting assembly 3 includes a first blade 31 connected to the second gear 22 and a second blade 32 connected to the fourth gear 24. The first blade 31 is connected to the second gear 22 through a first connection shaft 311, and the second blade 32 is connected to the fourth gear 24 through a second connection shaft 321. The first blade 31 and the second blade 32 rotate on the same plane. In this way, the distance between the first blade 31 and the second blade 32 is increased, so that no collision occurs between the two blades during operation. During installation, the first blade 31 and the second blade 32 are at a certain angle, preferably 90 degree. As the first blade and second blade are rotated in same speed, the collision between the first blade 31 and the second blade 32 is avoided while mowing the lawn. In other embodiment, the number and layout of gears and blades can be set according to actual needs, which is not limited herein.

Figure 3:
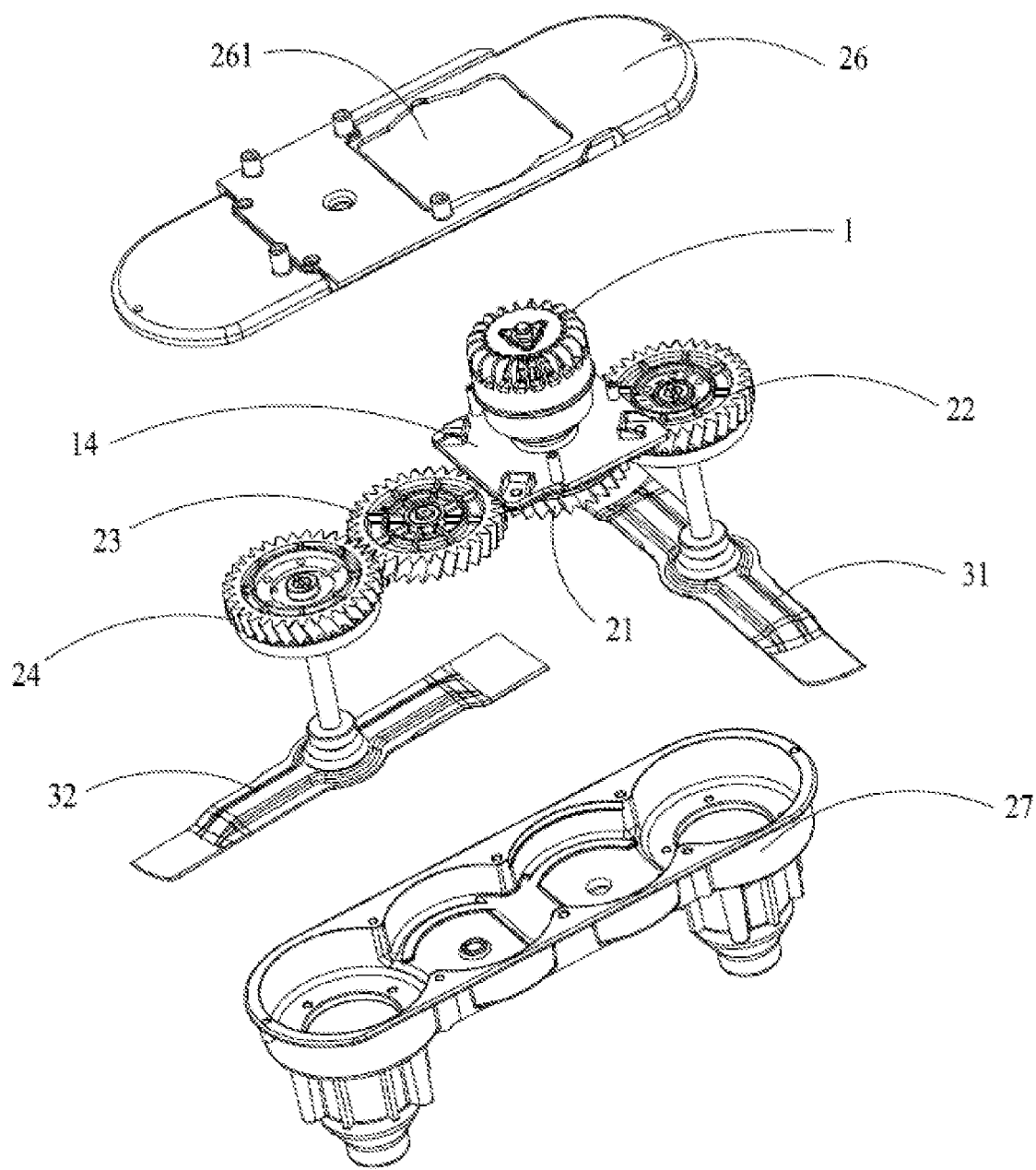
FIG. 3 is an exploded view of some assemblies in FIG. 2.

Please refer to FIG. 3, preferably, the transmission assembly 2 further includes a gear box for receiving the above four gears, and at least partly of the motor is located above the gear box. Specifically, the gear box includes an upper box 26 and a lower box 27. The upper box 26 is provided with an opening 261, and the bracket 14 is mounted on the opening 261. In this way, the lower end of the motor shaft 11 extends into the gear box through the opening 261 and is fixed to the first gear 21. The lower box 27 is provided with through holes through which the first connecting shaft 311 corresponding to the second gear 22 and the second connecting shaft 321 corresponding to the fourth gear 24 connected to the cutting blades.

Figure 7:
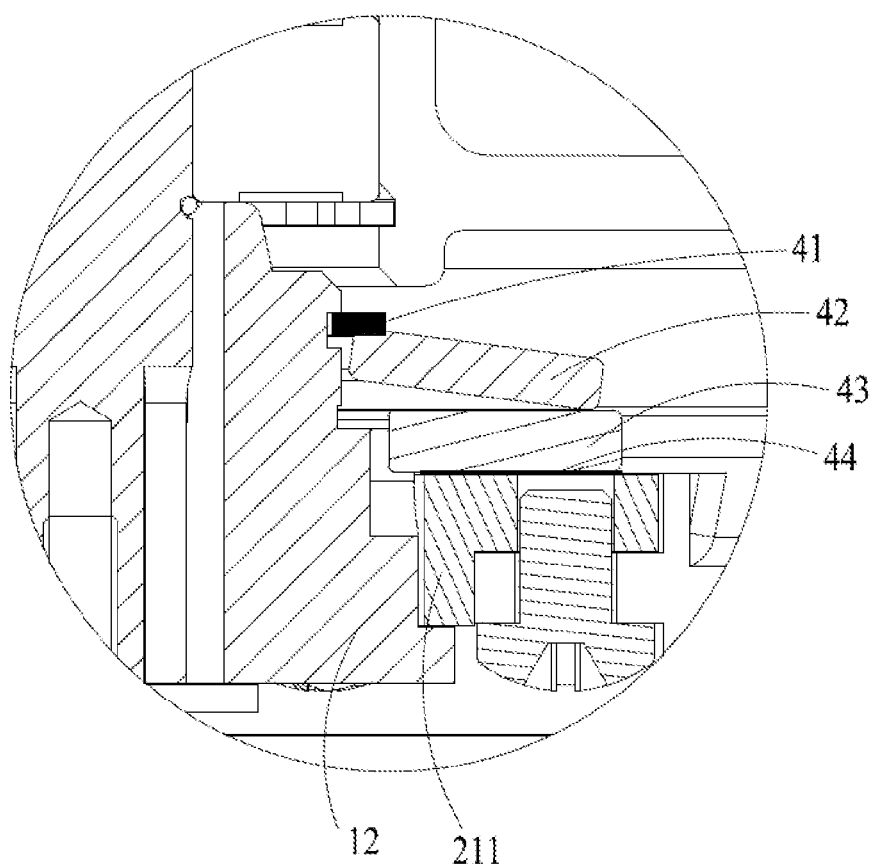
FIG. 7 is an enlarged view of a circled portion in FIG. 6.

Please refer to FIG. 4, FIG. 6 and FIG. 7, the impact protection assembly 4 includes a pressing member 41 and an elastic piece 42. The pressing member 41 presses the elastic piece 42 against the first gear 21, and the first gear 21 is connected to the motor shaft through the elastic piece 42. There is friction between the motor shaft 11 and the first gear 21. The first gear 21 is driven through friction between the motor shaft and the first gear 21. When the resistance received by the cutting assembly 3 is greater than a predetermined value, the first gear 21 and the motor shaft 11 have relative rotation. Preferably, the impact protection assembly 4 further includes a pressing block 43 and a friction plate 44 mounted between the elastic piece 42 and a gear connection member 211. The friction plate 44 is preferably a copper plate, which increases the friction force between the elastic member 42 and the first gear 21.

Figure 5:
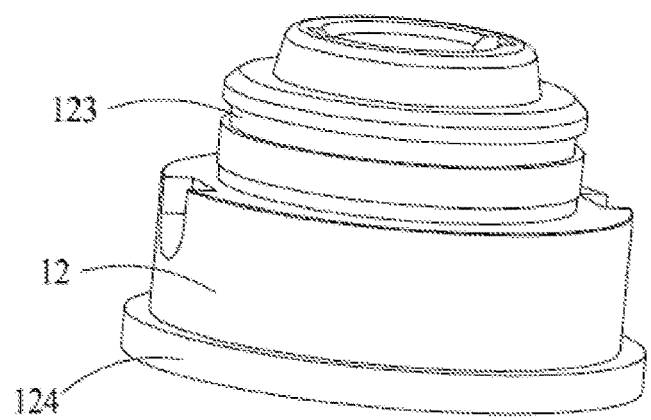
FIG. 5 is a perspective view of the sleeve in FIG. 4.

Please refer to FIG. 3 and FIG. 4, the first gear 21 includes a gear connection member 211 and a gear ring 212. The gear ring 212 is specifically fixed on the gear connection member 211 by five screws 213. The pressing member 41, the elastic piece 42, the pressing block 43, the friction plate 44 and the gear connection member 211 are sleeved on the shaft sleeve 12 in order. The elastic piece 42, the pressing block 43, the friction plate 44 and the gear connection member 211 are clamping by the pressing member 41 and the shaft sleeve 12. The friction plate 44 is in contact with the gear connection member 211. Specifically, as shown in FIG. 5, the pressing member 41 is an opening retaining ring. The upper end of the shaft sleeve 12 is provided with a groove 123 for mounting the pressing member 41. The pressing member 41 is fixed on the upper end of the shaft sleeve 12 through the groove 123. The lower end of the shaft sleeve 12 is provided with a protrusion 124 for blocking the gear connection member 211. The elastic piece 42, the pressing block 43, the friction plate 44 and the gear connection member 211 are clamping by the pressing member 41 and the protrusion 124. In addition, the frictional force of the elastic piece 42 can be set by setting the positions of the groove 123 on the sleeve 12.

When the resistance received by cutting assembly 3 is bigger than the frictional force of the elastic piece 42, a relative rotation will happen between the first gear 21 and the motor shaft 11. That is, the resistance of the obstacle passes through the second gear 22 or the third gear 23 to the first gear 21, and then is transmitted to the elastic piece 42 through the gear connection member 211. Since the friction force between the elastic piece 42 and the gear connection member 211 is smaller than the resistance, the rotation of the gear connection member 211 and the first gear 21 are stopped. The motor shaft 11 is still in a rotating state at this time, which causes slippage, so the teeth of each gear will not be damaged.

In the present invention, the control unit is used to control driving assembly 1, specifically being a PCB board. When the transmission assembly 2 and the motor shaft 11 rotate relatively (i.e., slip), the output power of the motor is larger than that of normal working, and the current increases. When the current of the lawn mower is higher than the set threshold, the control unit controls the driving assembly 1 to stop. In one embodiment, the threshold value is set to 30 A. This can effectively protect the motor and the gears.

The motor drives the gears to rotate, thereby driving the first blade 31 and the second blade 32 to rotate for cutting. When the first blade 31 or the second blade 32 is stopped by an obstacle, the reaction force of the obstacle will be transmitted to the second gear 22 or the third gear 23 and the fourth gear 24 through the first connecting shaft 311 or the second connecting shaft 321, respectively, and further transmitted to the first gear 21. Because the first gear 21 and the shaft sleeve 12 are pressed and fixed together by the elastic piece 42 and the gear connection member 211, when the reaction force transmitted to the first gear 21 is greater than the frictional force of the elastic piece 42, there will have relative rotation between the first gear 21 and the motor shaft 11 to prevent damaging the gear. At this moment, the current increases, the current of the lawn mower is higher than a predetermined threshold, and the control unit controls the driving assembly 1 to stop.

In summary, the lawn mower of the present invention provides an impact protection assembly between the driving assembly and the transmission assembly, so that when the reaction force of the cutting assembly by an external obstacle is greater than the frictional force of the impact protection assembly, the relative rotation between the transmission assembly and the motor shaft occurs, and then the purpose of protecting the transmission assembly is achieved. In addition, the number of blades is set to two, which improves the working efficiency of the lawn mower.

The above embodiment is only used to illustrate the present invention and not to limit the technical solutions described in the present invention. The understanding of this specification should be based on those skilled in the art. Although the present invention has been described in detail with reference to the above embodiment, however, those skilled in the art should understand that those skilled in the art can still modify or equivalently replace the present invention, and all technical solutions and improvements that do not depart from the spirit and scope of the present invention should be within the scope of the claims of the invention.

What is claimed is:

1. A lawn mower, comprising:
   a driving assembly, including a motor;
   an impact protection assembly, including a pressing member and an elastic piece;
   a transmission assembly; and
   a cutting assembly;
   wherein the pressing member presses the elastic piece against the transmission assembly and drives the transmission assembly and the cutting assembly to rotate synchronously with a motor shaft;
   when a resistance received by the cutting assembly is greater than a predetermined value that is sufficient to overcome a frictional force, provided by the pressing member and the elastic piece, between the motor shaft and the transmission assembly, the transmission assembly and the motor shaft rotate relatively;
   wherein the transmission assembly includes a first gear connected to the motor shaft and a second gear meshed with the first gear, and the cutting assembly includes a first blade connected to the second gear;
   wherein the impact protection assembly further comprises a pressing block and a friction plate, and the elastic piece, the pressing block and the friction plate are sequentially clamped by the pressing member and the first gear, the friction plate being a copper plate;
   wherein the first gear comprises a gear connection member and a gear ring fixed on the gear connection member, and the friction plate is in contact with the gear connection member; and
   wherein the motor further comprises a shaft sleeve fixed on the motor shaft, one end of the shaft sleeve is provided with a groove for mounting the pressing member, and the other end of the shaft sleeve is provided a protrusion in the radial direction, the elastic piece, the pressing block, the friction plate and the gear connection member being sequentially sleeved on the shaft sleeve and clamped between the pressing member and the protrusion, the pressing member is a retaining ring having a gap.

2. The lawn mower according to claim 1, wherein the transmission assembly further comprises a third gear and a fourth gear, and the third gear meshes with the first gear and the fourth gear respectively, the cutting assembly further including a second blade connected to the fourth gear.

3. The lawn mower according to claim 2, wherein the second gear and the third gear are located on opposite sides of the first gear respectively, and the fourth gear is disposed away from the first gear.

4. The lawn mower according to claim 3, wherein the four gears rotate in the same plane, and the first blade and the second blade rotate perpendicular to each other and rotate in the same plane.

5. The lawn mower according to claim 2, wherein the transmission assembly further comprises a gear box for receiving the four gears, and the gear box is provided with an opening for installing the driving assembly, and the driving assembly includes a bracket that mates with the opening to mount the driving assembly on the gear box.

6. The lawn mower according to claim 1, wherein when a current of the lawn mower is higher than a predetermined threshold, the driving assembly stops.

\* \* \* \* \*